United States Patent Office.

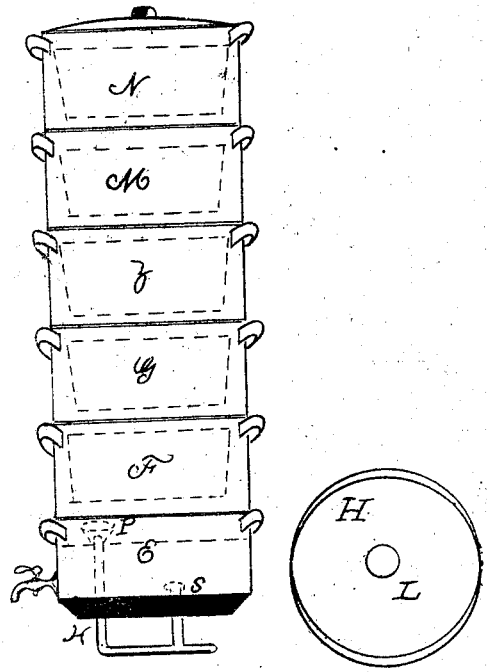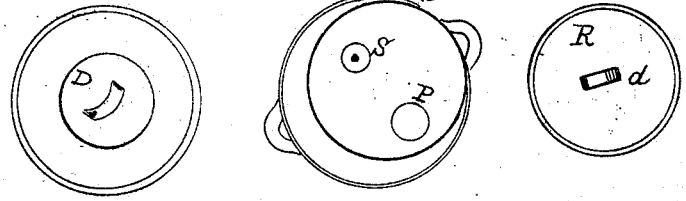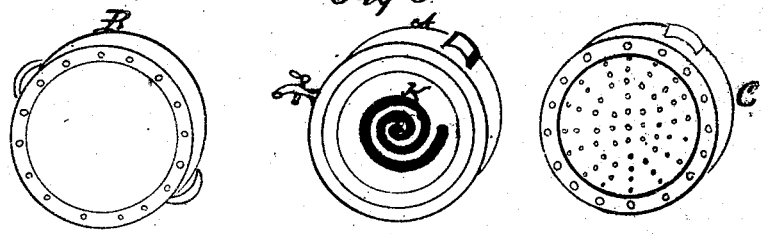

JAMES WILLARD PATTERSON, OF CINCINNATI, OHIO, ASSIGNOR TO SARAH ELLEN PATTERSON, OF SAME PLACE.

Letters Patent No. 74,123, dated February 4, 1868.

IMPROVEMENT IN CULINARY VESSELS.

*The Schedule referred to in these Letters Patent and making part of the same.*

TO ALL WHOM IT MAY CONCERN:

Be it known that I, JAMES W. PATTERSON, of the city of Cincinnati, and State of Ohio, have invented a new and useful Device for Cooking; and I do hereby declare that the following is a full, clear, and exact description of the construction and operation of the same, reference being had to the accompanying drawings, and the letters of reference marked thereon.

My invention consists in cooking by steam in several vessels that are placed one above the other in the form of a column, and each vessel having a close-fitting cover. The difference between this and other modes of cooking is that the steam cooks the food without coming in contact with it, whilst in other arrangements the vapor commingles with and passes through the food being cooked. Also, I so construct these cooking-vessels that a perfect steam-chamber surrounds them on all sides, so that the heat is equally distributed to every part of the vessel.

My invention also consists in attaching to the bottom of the boiler a coil of pipe, in such a manner as to leave one end of the pipe submerged in the water to supply the coil, whilst the other end passes to the surface of the water, and conducts the steam generated in that part of the coil below the bottom to the chamber in the boiler above the water.

I do not use the coil specially to increase the heating-surface of the boiler, but use it for generating steam, it heating it more intensely; and thus its expansion forcibly passes it through the long pipe, and circulates it around the covered cooking-vessels above.

To enable others to make and use my invention, I will proceed to describe its construction and operation.

The outer part of the vessels may be constructed of metallic substances or wood, and the inner vessel of metal, or of earthen or porcelain material.

Figure 1 represents the column, with several cooking-vessels attached or resting upon the boiler. N, M, Z, G, and F are the cooking-vessels; E represents the boiler-vessel, with coil attached to its bottom; K represents the coil of pipe which generates the steam. In fig. 2, the dotted lines on the vessels F, &c., represent the inner closed vessels as suspended in the cylinders, in which material to be cooked is placed, and form the inner cylinders.

Figure 2 represents an inside view of the boiler. P is the long end of the pipe, which passes up to near the top of the boiler, with open side cap attached; S, the short end of the pipe, which supplies the coil, and has the water-gauge cap attached; D is the top cover to the top vessel; R is the close or inner cover; $d$ is the handle, covering a perforation on the centre; H is the inside view of the close cover; L is the perforation.

Figure 3. A represents the boiler, resting on its side, presenting its bottom; K represents the coil, attached to the bottom; B represents the top and inside view of the cooking-vessel, showing the steam-chamber holes, through which the steam passes from one vessel to the other; C represents the top rim, connecting the outer and the inside vessels with the steam-holes through the rim; P, in the boiler, in fig. 1, represents the steam-pipe, with open cap, which conducts the steam from the coil to the surface of the water-line; J represents the water-line or surface, as represented by the dotted line; S represents the short end of the coil submerged in water, with the gauge-cap attached, through which the water passes to supply the coil.

The operation of the device above described will be readily understood without further detailed description.

Having thus described the nature of my invention, what I claim herein as new, and desire to secure by Letters Patent, is—

1. I claim the suspending of a series of cooking-vessels, having imperforated bottoms and sides, and provided with close covers, in an upright column or series, in such a manner as to form steam-chambers above, below, and around each, as and for the purposes substantially set forth.

2. I claim the steam or water-coil K, provided with shield P, and cap S, when used in connection with the boiler E, in the manner and for the purposes set forth.

3. In each of a series of cooking-vessels, arranged substantially as shown, and used in connection with the boiler, I claim the chamber formed between the close sides of the inner and outer cylinder.

4. I claim the combination of the series of cooking-vessels N, M, &c., with the boiler E, the whole made substantially as described, and so as to operate in the manner set forth.

JAS. WILLARD PATTERSON.

Witnesses:
JAS. A. ASHLEY,
D. WILSON.